No. 801,333. PATENTED OCT. 10, 1905.
A. OEHLSCHLÄGER.
PINCE NEZ FRAME.
APPLICATION FILED JAN. 23, 1905.

Witnesses:
W. Babcilbey
L. H. Staaden.

Inventor:
August Oehlschläger

UNITED STATES PATENT OFFICE.

AUGUST OEHLSCHLÄGER, OF RATHENOW, GERMANY.

PINCE-NEZ FRAME.

No. 801,333.   Specification of Letters Patent.   Patented Oct. 10, 1905.

Application filed January 23, 1905. Serial No. 242,269.

*To all whom it may concern:*

Be it known that I, AUGUST OEHLSCHLÄGER, a subject of the King of Prussia, German Emperor, residing at Rathenow, in the Kingdom of Prussia and German Empire, have invented new and useful Improvements in Pince-Nez Frames, of which the following is a specification.

Frames for eyeglasses made of a single piece, in which there is not an exact or uniform horizontal displacement of the eyeglass plane, are already known, but not frames for the so-called "cylindrical eyeglasses," in which a relative displacement of the frames with the eyeglasses takes place in an exactly horizontal plane without any twisting of the glasses and in which the bridge must consist of two relatively displaceable parts, each of which forms one piece with one of the eyeglass-frames, respectively. Hitherto pince-nez frames for said cylindrical eyeglasses have been formed in such a manner that the bridge or the yoke and the frame have been made in two parts, connected one with the other by soldering. Frames formed in this manner, however, present the defect that the points of junction between the bridge and frame necessitate subsequent finishing by filing or hammering, as a result of which also, especially in the case of plated metal being used for the manufacture of eyeglass-frames, the plated metal is injured at the points of connection, so that it must be completed or replaced in a further gilding or plating operation. Subsequent gilding of single portions, however, soon becomes visible when the glasses have been in use for some little time, owing to the fact that the freshly-gilded places either become black or deposit verdigris, this detracting from the strength and appearance of the glasses. All these defects are completely obviated by the pince-nez frame forming the subject of this invention and illustrated in the annexed drawings, wherein—

Figure 1:
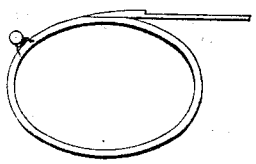
Figure 2:
Figure 3:
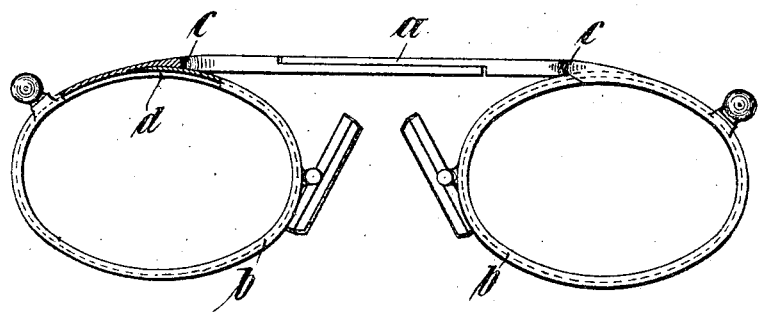

Figure 1 is a side view of a glass-frame with the yoke portion thereon as heretofore made. Fig. 2 is a plan of the glass-frame with the yoke portion thereon as used in the invention, the frame being shown in the form of a straight-grooved wire or strip—*i. e.*, in the shape previous to its bending into the closed ring form. Fig. 3 is a side view of a pince-nez frame made according to the invention.

In the present pince-nez frame, which is exclusively intended for carrying so-called "cylindrical eyeglasses," the bridge or yoke $a$ and the frame portion $b$ are formed by bending a single strip of metal into the proper shape. To this end at the place at which the frame portion $b$ branches off from the bridge portion $a$ the metal strip is provided in the known manner with a break $c$, as will be clearly seen in Fig. 2. Now before the frame portion $b$ is bent and rounded for the reception of the eyeglass it is provided with a groove $d$, Fig. 2, which may be carried through without interruption up to the break in the metal strip. Then the portion of the groove of the frame in the break $c$ is specially widened or deepened, as at $x$, Fig. 2, in order to serve for the reception or support of the other free end of the frame portion when this has been bent round. The frame ends are preferably connected at $x$ by soldering, the solder entering the widening $x$ of the groove $d$, which serves for holding the glass. When the bridge or bar has been brought into the required form, the frame is assembled in the known manner. As already stated, owing to this form or method of construction of the pince-nez frame or of the bridge and frame members in a single piece soldering and subsequent finishing of the outer visible surfaces by filing or hammering is not necessary, so that when plated metal is used it will not be damaged and no regilding of damaged parts will be required.

It will readily be understood that by means of this invention the manufacture of pince-nez frames is greatly simplified and facilitated, in addition to which pince-nez of this kind are far more durable.

The bridge or bar may of course be made of different forms and cross-sections—for example, circular, semicircular, oval, flat, or the like—exactly as in the case of pince-nez as hitherto constructed.

What I claim as my invention, and desire to secure by Letters Patent, is—

As a new article of manufacture a pince-nez frame consisting of two grooved members, $b$, adapted for the reception of the glasses, and a bridge, $a$, having a break, $c$, near the point of connection with the said members and having a groove, $x$, for the reception of the bent end of the frame member to be united therewith, essentially as and for the purpose set forth.

In testimony whereof I have signed my name to this specification in the presence of two subscribing witnesses.

AUGUST OEHLSCHLÄGER.

Witnesses:
CARL GARZ,
PAUL MÜLLER.